Aug. 21, 1928.
J. KAUTZ
1,681,483
ATTACHMENT FOR SAW FILING CLAMPS
Filed Sept. 20, 1926
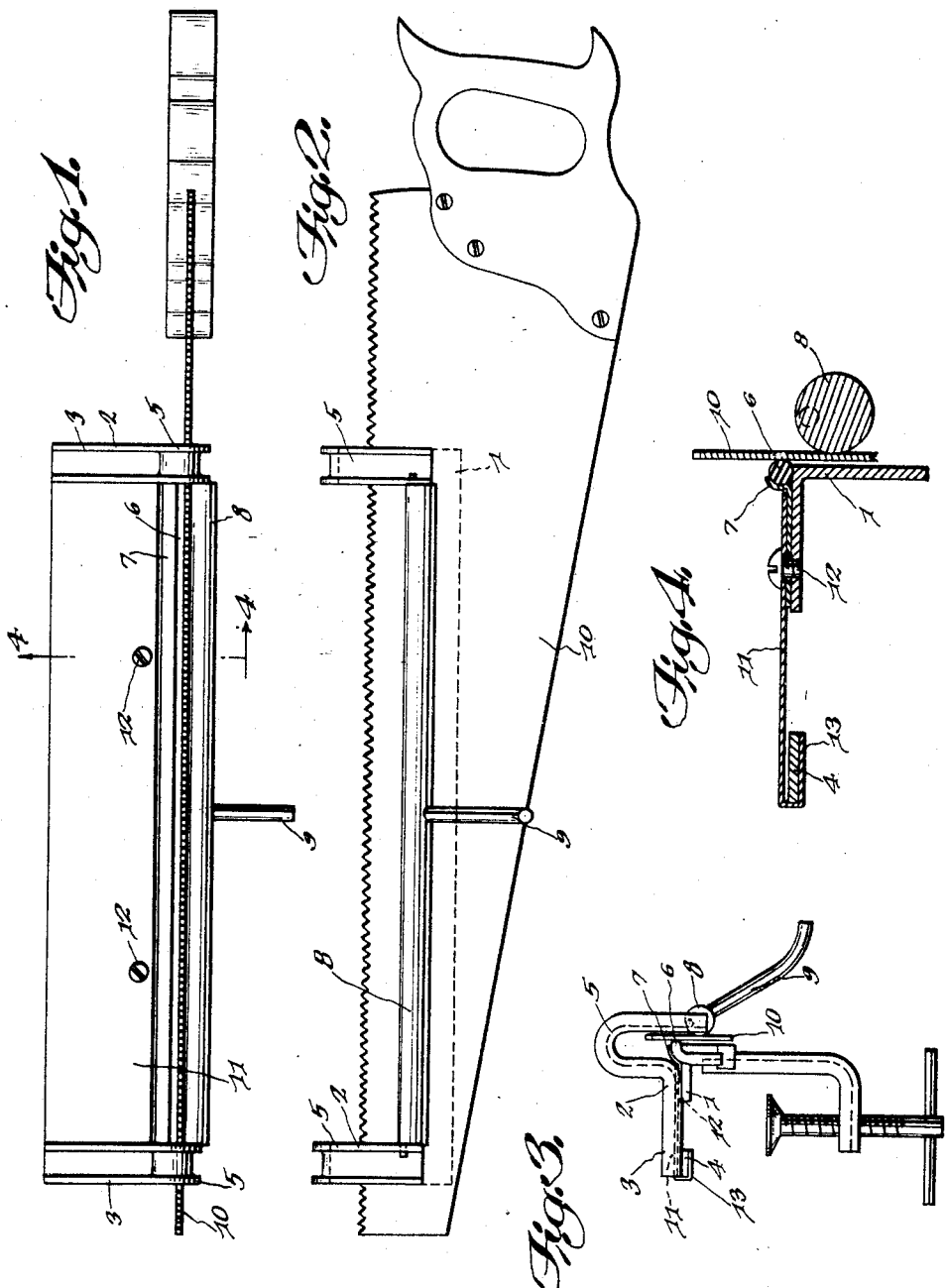
Jacob Kautz
INVENTOR
BY Victor J. Evans
ATTORNEY Patented Aug. 21, 1928.

1,681,483

UNITED STATES PATENT OFFICE.

JACOB KAUTZ, OF CHICAGO, ILLINOIS.

ATTACHMENT FOR SAW-FILING CLAMPS.

Application filed September 20, 1926. Serial No. 136,641.

This invention relates to new and useful improvements in attachments for saw filing clamps. The main object of the invention is the provision of a reflective board or surface attached to the saw clamp and arranged upon the side opposite from which the operator stands during the operation of filing the saw whereby the teeth of the saw are positioned with respect to the reflecting plate so that each of the teeth will be clearly defined and the operator filing the teeth will be able to readily ascertain when the proper amount of filing has been carried out in order to properly sharpen the teeth.

As a general rule in filing saw teeth at the present time it is rather difficult to ascertain when the teeth have been properly filed and in view of the poor light reflected on the saw teeth and in order to bring out more visibly the condition of the teeth a reflecting plate or surface is attached to the clamp which retains the saw in position during the filing and is so positioned with respect to the operator that it will form a background for the teeth of the saw so as to make them clearly visible to the operator, it being understood that this background may be of highly polished metal or any white surface.

Another object of my invention is the provision of a reflecting attachment in the form of a plate adapted to be applied to the body of the saw filing clamp and of a material which will clearly set out the saw teeth so that the saw teeth will be clearly defined to the vision of the operator and whereby the operator can readily ascertain when the teeth have been properly filed. This background or plate may be of any material of such color as to form a background whereby all of the teeth of the saw will be clearly visible to the operator and it is further understood that it can be reflective or non-reflective.

With the above and other objects in view, the invention consists in the novel features of construction, the combination and arrangements of parts hereinafter more fully set forth, pointed out in the claim and shown in the accompanying drawings, in which:

Fig. 1 is a top plan view of the saw filing clamp, illustrating the application of my invention.

Fig. 2 is a front elevation.

Fig. 3 is an end elevation.

Fig. 4 is a transverse section on the line 4—4 of Fig. 1.

In the drawings I have illustrated an ordinary type of saw clamp used for retaining the saw in position during the filing operation. This clamp in the present instance comprises an angular body plate 1 having brackets 2 attached to each end thereof, said brackets comprising the horizontal arms 3 which are attached to the ends of the plate 1 and the longitudinal bar 4. The forward ends of the brackets 2 are U-shaped as at 5 to form guides for the upper edge of the saw.

Arranged along the upper edge of the plate 1 is a rubber clamping strip 6 retained in position by means of a clamping plate 7. Disposed opposite the vertical portion of the body plate 1 is a clamping roller 8 which is eccentrically mounted in one of the lower ends of the U-shaped guide members 5 and is provided with a handle 9 for rotating the same in order to clamp the saw blade 10 in position against the rubber clamping strip 6.

In the saw clamps in use at the present time, when a saw blade is in position as shown in Figs. 1 and 2 the background for the saw teeth opposite the operator is usually of a nature whereby the saw teeth are not clearly distinguishable by the operator or, in other words, it is necessary for the operator to test the teeth in some manner during the filing to ascertain whether or not they have reached the proper stage of filing and in order to clearly set out these teeth so that the condition of the same will be visible to the operator, a plate 11 is attached to the horizontal portion of the body plate 1 and a longitudinal bar 4 and positioned directly behind the saw blade, with respect to the position of the operator, and this plate 11 may be either a reflective plate or of highly polished material or of such a color that the saw teeth will be clearly visible to the operator during the filing operation. The plate 11, in the present instance, is attached to the angular plate 1 by means of screw bolts 12 while the outer longitudinal edge thereof is turned under the longitudinal bar 4 as shown at 13 whereby to clearly retain this plate in position.

While I have disclosed, for the purpose of illustration, the type of clamp described above, I wish it to be understood that any type of clamp can be used and have my improved plate applied thereto in any suitable manner so that the reflective rays from the plate will enable the operator to clearly distinguish the condition of the saw teeth upon which he is operating and this plate, as stated heretofore, may have a reflective surface or of such color that will produce reflective rays of light when the saw is clamped in position before the same.

While I have shown and described the preferred embodiment of my invention, it will be understood that various changes and alteration may be made without departing from the spirit of the invention or the scope of the appended claim.

Having thus described my invention, what I claim is:

The combination with a saw clamp including spaced brackets having rearwardly extending horizontal portions, a bar connected to said portions, and a body plate having horizontal portions, of a reflector plate supported at its outer end by the horizontal portions of the body plate and at its inner end by said bar, said reflector plate being positioned to the rear of a saw plate when said plate is supported by said clamp.

In testimony whereof I affix my signature.

JACOB KAUTZ.